2,979,113
HEAT SEALING APPARATUS

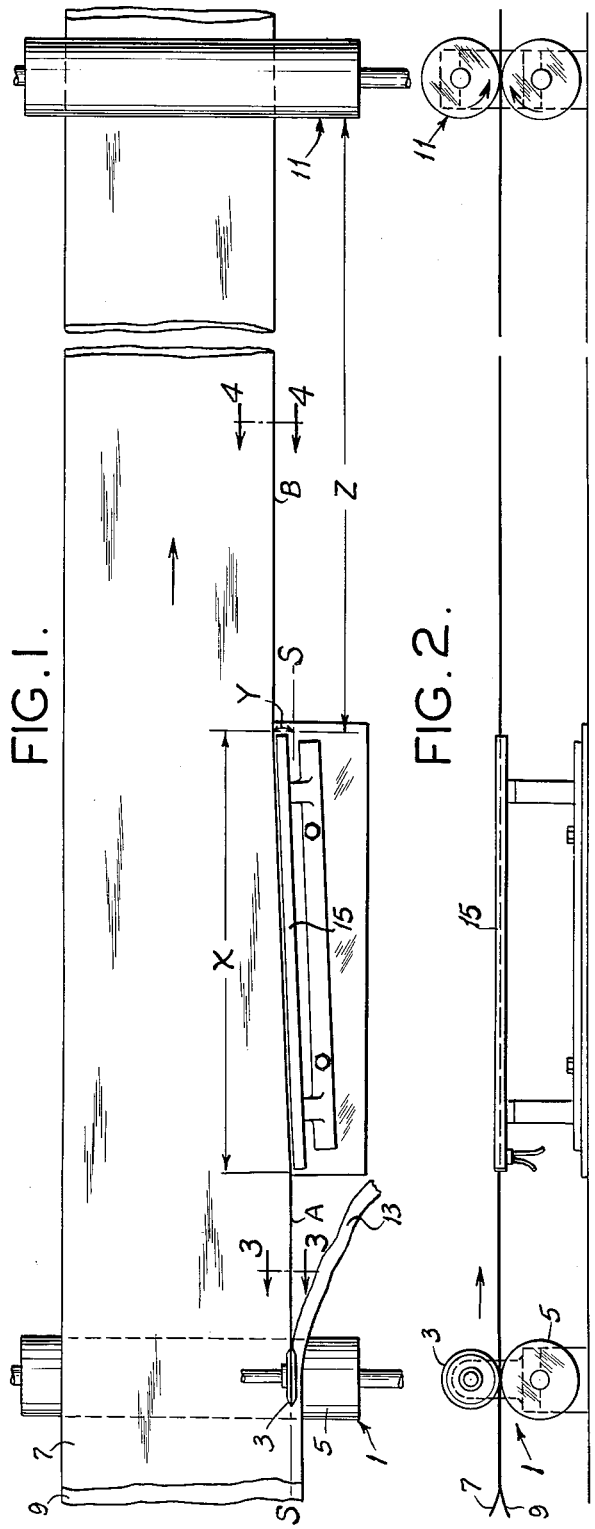

Wilfred E. Stageberg, Terre Haute, Ind., assignor to Bemis Bro. Bag Company, St. Louis, Mo., a corporation of Missouri Continuation of application Ser. No. 631,827, Dec. 31, 1956. This application Jan. 11, 1960, Ser. No. 1,820

7 Claims. (Cl. 154—42)

This invention relates to apparatus for heat sealing heat-sealable materials such as polyethylene, and more particularly to apparatus for edge sealing such materials.

This application is a continuation of my copending United States application for Heat Sealing Apparatus, Serial No. 631,827, filed December 31, 1956, now abandoned.

Among the several objects of the invention may be noted the provision of apparatus for producing a strong and dependable continuous heat seal between the edges of two or more superimposed layers of heat-sealable sheet material, such as polyethylene; and the provision of apparatus of this class which is economical to build and easy to set up and maintain. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan view of an apparatus of this invention, showing two layers of material being edge-sealed;

Fig. 2 is a side elevation of Fig. 1; and,

Figs. 3 and 4 are enlarged cross sections taken on lines 3—3 and 4—4 of Fig. 1, with the layers shown as separated for purposes of illustration.

Corresponding reference characters indicate corresponding parts throughout the several views of the drawings.

Referring to the drawings, an apparatus of this invention is shown to comprise a slitter 1 for trimming off a portion of two or more superimposed layers of heat-sealable sheet material, such as polyethylene, and providing aligned fresh-cut edges for the layers with some degree of mechanical adhesion between the layers at said edges. As illustrated, the slitter 1 comprises a circular knife 3 and a hardened steel roll or mandrel 5. Two layers of material are shown, designated 7 and 9. The apparatus further comprises means for drawing the layers through the slitter in a plane path extending from the slitter to the drawing means. As shown, this drawing means comprises a pair of draw rolls 11. These are positively driven by any suitable means (not shown) to draw the layers through the slitter at a predetermined speed.

The knife 3 of the slitter is located near one end of the roll 5 to trim off a narrow marginal portion of each layer as indicated at 13, the trimmed-off material being disposed of as waste. The cut made by the slitter is a crush cut, and results in mechanical adhesion of the layers along the aligned fresh-cut edges of the layers as indicated at A in Fig. 3. This adhesion or initial welding together of the layers by the slitting action is advantageous. It appears to facilitate fusion of the edges of the layers.

The apparatus further comprises means for effecting heat-sealing together of the fresh-cut edges of the layers as they travel in the stated plane path from the slitter 1 to the draw rolls 11. As shown, this means comprises an electrical resistance heater bar 15 (such as a Nichrome bar) adapted to be heated by flow of suitable current therethrough to a temperature sufficient to effect melting of the heat-sealable material. Bar 15 is located between the slitter and the draw rolls in the plane of the layers and, as shown in Fig. 1, it extends at an angle to the direction of travel of the layers and is adapted to melt back the fresh-cut adhered edges of the layers and form a fused bead therealong. The rearward end of the bar toward the slitter 1 is located outward of the plane S—S in which the layers are slit by the slitter, and the bar is angled inward toward the layers at an angle indicated at Y in Fig. 1 which corresponds to the rate at which the layers are melted back by the bar. Sufficient distance Z is allowed between the bar and the draw rolls for cooling of the material before it contacts the draw rolls.

The above-described arrangement is such that as the layers with their aligned fresh-cut adhered edges pass alongside the bar 15 (heated to red heat in the case of polyethylene layers, for example), the radiant heat from the bar melts the edges of the layers back, creating a bead of molten material along the layers in the zone indicated at X in Fig. 1. The angle Y at which the bar 15 is set in respect to the direction of travel of the layers corresponds to the rate at which the layers are melted back, and is related to the speed of the layers (the heavier the seal desired, the slower the speed of the layers and the greater the angle Y). The edges of the layers do not actually touch the bar. They melt back in such manner that the molten bead does not come into contact with the bar. To the eye, the gap between the bar and the layers seems to be an area of intense gaseous heat. During the travel of the material through the distance Z, the bead cools and becomes a strong dependable seal, being indicated at B in Fig. 4.

The following example illustrates the invention. The bar 15 was approximately eight inches long and was set at an angle of approximately one-eighth inch in eight inches of length. Two layers of two mil polyethylene were drawn through the apparatus at a speed of approximately one hundred feet per minute. Distance Z was approximately five feet. The bar was heated to a very bright red.

It will be understood that the invention is not limited to the use of an electrical resistance heater bar. Other heater means may be used, such as a gas burner producing a series of flames, or a bar which is heated (to red heat, for example) by a gas burner or other suitable means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for heat-sealing two or more superimposed layers of heat-sealable sheet material along aligned edges thereof comprising a heating means, and means for feeding two ore more such superimposed layers of heat-sealable sheet material toward and past said heating means with said layers traveling in a predetermined path and with said aligned edges traveling in a predetermined plane normal to said path up to said heating means, said heating means comprising an elongate heater and means supporting said heater in a fixed position extending alongside said edges throughout a portion of said path with the rearward end of said heater in respect to the direction of travel of the layers positioned outward of but closely adjacent said plane, and with said heater angled inward in the direction toward the edges of the layers from its rearward end toward its forward end and adapted to melt back said edges and form a fused bead therealong without contacting said edges.

2. Apparatus for heat-sealing two or more superimposed layers of heat-sealable sheet material along aligned edges thereof comprising a slitter for trimming off a portion of two or more such superimposed layers of heat-sealable sheet material and providing aligned fresh-cut edges for the layers with some degree of mechanical adhesion between the layers at said edges, means for drawing the layers through the slitter in a predetermined path extending from the slitter to said drawing means, and means for effecting heat-sealing together of said fresh-cut edges as the layers travel from the slitter to said drawing means, said fresh-cut edges traveling from said slitter to said heat-sealing means in the plane in which the layers are slit by the slitter, said heat-sealing means comprising an elongate heater and means supporting said heater in a fixed position between the slitter and the drawing means extending alongside the edges throughout a portion of said path with the rearward end of the elongate heater toward the slitter located outward of but closely adjacent to said plane in which the layers are slit by the slitter and with the heater angled inward in the direction toward the edges of the layers from its rearward end to its forward end and adapted to melt back said edges and form a fused bead therealong without contacting said edges.

3. Apparatus for heat-sealing two or more superimposed layers of heat-sealable sheet material along aligned edges thereof comprising a slitter constituted by a circular knife and a mandrel for trimming off a portion of two or more such superimposed layers of heat-sealable sheet material by means of a crush cut and providing aligned fresh-cut edges for the layers with some degree of mechanical adhesion between the layers at said edges, means for drawing the layers through the slitter in a plane path extending from the slitter to said drawing means, and means for effecting heat-sealing together of said fresh-cut edges as the layers travel from the slitter to said drawing means, said fresh-cut edges traveling from said slitter to said heat-sealing means in the plane of said circular knife, said heat-sealing means comprising an elongate heater and means supporting said heater in a fixed position between the slitter and the drawing means extending alongside the edges throughout a portion of said plane path with the rearward end of the elongate heater toward the slitter located outward of but closely adjacent the plane of the circular knife and with the heater angled inward in the direction toward the edges of the layers from its rearward end to its forward end and adapted to melt back said edges and form a fused bead therealong without contacting said edges.

4. Apparatus for heat-sealing two or more superimposed layers of heat-sealable sheet material along aligned edges thereof comprising a slitter constituted by a circular knife and a mandrel for trimming off a portion of two or more such superimposed layers of heat-sealable sheet material by means of a crush cut and providing aligned fresh-cut edges for the layers with some degree of mechanical adhesion between the layers at said edges, draw rolls for drawing the layers through the slitter in a plane path extending from the slitter to said draw rolls, and means for effecting heat-sealing together of said fresh-cut edges as the layers travel from the slitter to said draw rolls, said fresh-cut edges traveling from said slitter to said heat-sealing means in the plane of said circular knife, said heat-sealing means comprising an elongate electrical resistance heater bar and means supporting said bar in a fixed position between the slitter and the draw rolls in the plane of said layers extending alongside the edges throughout a portion of said plane path with the rearward end of the bar toward the slitter located outward of but closely adjacent the plane of the circular knife and with the bar angled inward in the direction toward the edges of the layers from its rearward end to its forward end and adapted to melt back said edges and form a fused bead therealong without contacting said edges, the distance from the bar to the draw rolls being sufficient for cooling of the bead before contacting the draw rolls.

5. Apparatus for heat-sealing two or more superimposed layers of heat-sealable sheet material along aligned edges thereof comprising means for trimming off a portion of two or more such superimposed layers of heat-sealable sheet material and providing aligned edges for the layers, means for feeding the layers through and past said trimming means with said layers traveling in a predetermined path, and means for effecting heat-sealing together of said aligned edges as the layers travel beyond the trimming means, said aligned edges traveling from the trimming means to the heat-sealing means in the plane in which the layers are trimmed by the trimming means, said heat-sealing means comprising an elongate heater and means supporting said heater in a fixed position with one side of the heater in the plane of said layers and opposed to said edges and with said heater extending closely adjacent to but not contacting said edges, the rearward end of said heater being located outward of the plane in which the layers are trimmed by the trimming means and said heater extending forward in such direction in relation to the edges of the layers that when heated it is adapted to melt back said edges and form a fused bead therealong without contacting said edges.

6. Apparatus for heat-sealing two or more superimposed layers of heat-sealable sheet material along aligned edges thereof comprising a crush-cut slitter for trimming off a portion of two or more such superimposed layers of heat-sealable sheet material and providing aligned fresh-cut edges for the layers with some degree of mechanical adhesion between the layers at said edges, means for feeding the layers through and past the slitter with said layers traveling in a predetermined path, and means for effecting heat-sealing together of said fresh-cut edges as the layers travel beyond the slitter, said fresh-cut edges traveling from the slitter to the heat-sealing means in the plane in which the layers are slit by the slitter, said heat-sealing means comprising an elongate electrical resistance heating bar and means supporting said bar in a fixed position with one side of the bar in the plane of said layers and opposed to said edges and with said bar extending closely adjacent to but not contacting said edges, the rearward end of said bar being located outward of the plane in which the layers are slit by the slitter and said bar extending forward in such direction in relation to the edges of the layers that when heated it is adapted to melt back said edges and form a fused bead therealong without contacting said edges.

7. Apparatus as set forth in claim 6 wherein said slitter comprises a circular knife and a mandrel.

References Cited in the file of this patent

UNITED STATES PATENTS

| | | |
|---|---|---|
| 2,556,476 | Lamport | June 12, 1951 |
| 2,711,779 | Carland | June 28, 1955 |
| 2,756,819 | Judelson | July 31, 1956 |
| 2,759,524 | Davis | Aug. 21, 1956 |